Feb. 11, 1941.  L. L. FOUNTAIN  2,231,711
THREE-PHASE COMPENSATOR
Filed Dec. 28, 1939
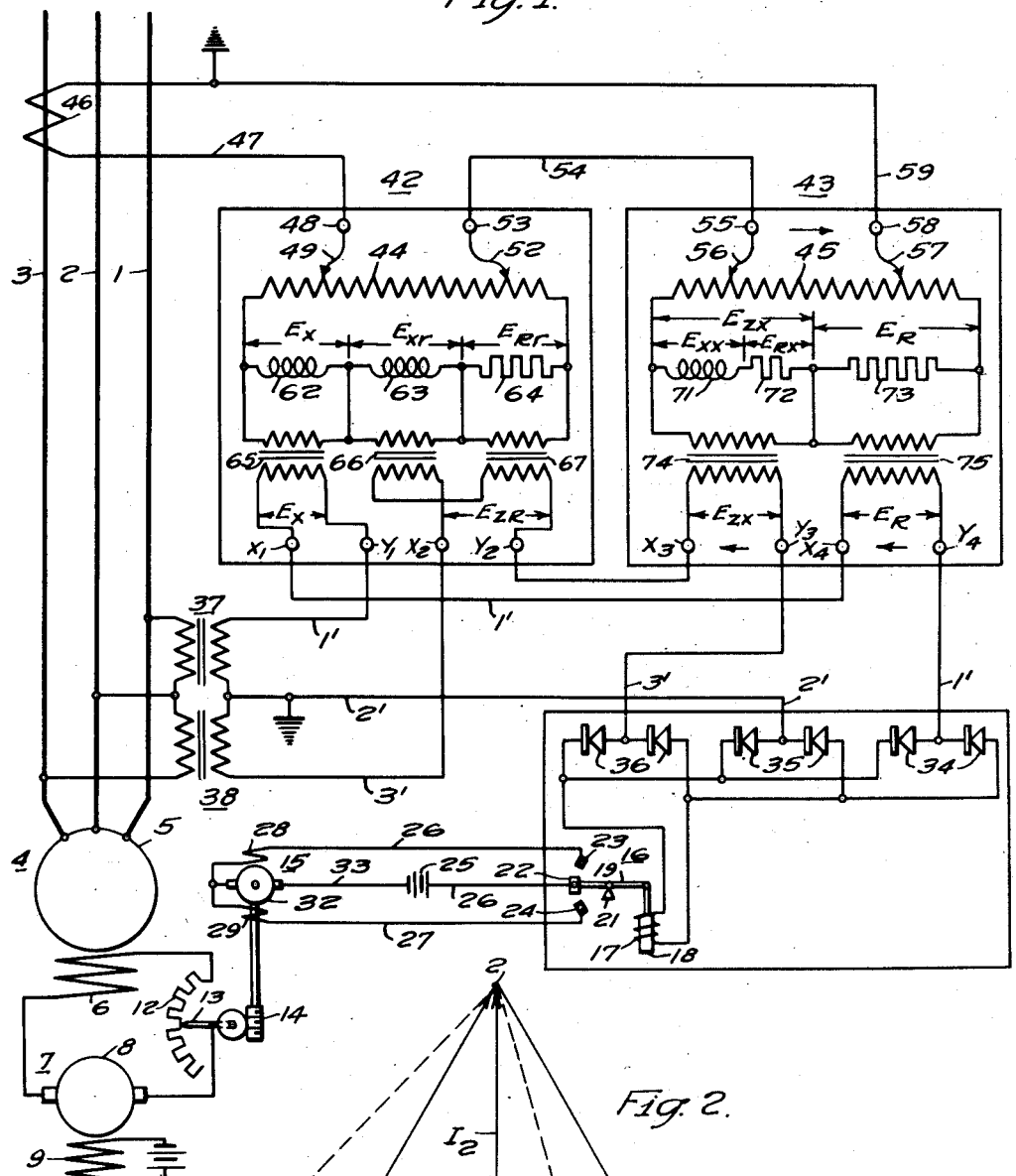
WITNESSES:
INVENTOR
Lawrence L. Fountain.
BY
ATTORNEY Patented Feb. 11, 1941

2,231,711

UNITED STATES PATENT OFFICE 2,231,711

THREE-PHASE COMPENSATOR

Lawrence L. Fountain, Wilkinsburg, Pa., assignor to Westinghouse Electric & Manufacturing Company, East Pittsburgh, Pa., a corporation of Pennsylvania Application December 28, 1939, Serial No. 311,394

7 Claims. (Cl. 171—119)

My invention relates to voltage responsive devices and has particular relation to means for compensating such devices connected to be responsive to a polyphase circuit voltage.

It is frequently desirous to energize a voltage responsive device in accordance with the average of the three-phase voltages of a three-phase circuit. It is then necessary that the compensating equipment compensate for the average voltage drop in the three phases of the circuit if accurate compensation is to be effected.

Such compensation may be secured by connecting a compensator device consisting of a reactor element and a resistor element into each phase conductor of the circuit through which the voltage responsive device is energized and in energizing the several compensator devices with currents that bear a predetermined relation to the current flowing in the associated phases of the electrical circuit to be compensated. The compensators are so connected in the circuit and so adjusted that ohmic and reactive voltage drops across each compensator are proportional to the ohmic and reactive drops in the associated phases of the circuit. In a compensator of this character, it has been necessary to employ three interconnected current transformers to secure the necessary shift in the phase position of the current that energizes each compensator from the current flowing in one conductor of the associated phase, one transformer being connected in each conductor of the three-phase circuit.

In order to avoid the somewhat complicated arrangement of circuits and apparatus required in such compensators, compensating apparatus has been developed for using a single phase voltage produced from one of the phases of the multi-phase circuit. When a single phase voltage is developed from a single phase current for compensating purposes and is added or subtracted from a three-phase voltage, the result is an unbalanced three-phase voltage. When such an unbalanced voltage is rectified and applied to the coil of a voltage responsive device, such as a voltage regulator, the 60-cycle ripple present in the rectified voltage causes the movable element of the regulating device to vibrate in unison with it. This vibration is objectionable as effecting the desired operation of the regulator. Furthermore, such single phase compensation does not give mathematically true results, and when large values of compensating voltages are required, the resulting error becomes quite pronounced.

It is an object of my invention to provide a balanced three-phase compensating voltage from a single-phase current which can be added to, or subtracted from, the three-phase voltage supplied to the control element of a voltage regulator or to similar voltage responsive devices.

Other objects and advantages of the invention will be apparent from the following description of one preferred embodiment of the invention, reference being had to the accompanying drawing, in which:

Figure 1 is a diagrammatic view of circuits and apparatus illustrating an embodiment of the invention; and Fig. 2 is a vector diagram illustrating the vector relation of the voltage applied across parts of the apparatus.

Referring to the drawing, a three-phase power circuit is illustrated represented by the three-phase conductors 1, 2 and 3 that are supplied with energy from an alternating current generator 4, having an armature winding 5 connected to the three-phase circuit and a field winding 6 that is supplied with current from an exciter generator 7 having an armature winding 8 and a field winding 9. For the purpose of controlling the output voltage of the generator 4 a rheostat 12 is provided in the circuit between the exciter generator 7 and the field winding 6 having a movable contact arm 13 actuated through suitable gearing mechanism 14 in accordance with the operation of a pilot motor 15 as controlled by a regulator 16. The regulator 16 comprises a winding 17 for magnetizing a core member 18 for varying the position of a regulator lever 19 that is pivotally mounted at 21 to actuate a movable contact member 22 into engagement with the one or the other of the contact members 23 or 24 for completing the one or the other of two motor circuits. The motor circuits extend from a source of electric energy represented by the battery 25 through the conductor 26, the contact member 22, one of the contact members 23 or 24, one of the associated conductors 26 or 27, through the one or the other of the differentially related field windings 28 or 29, the armature winding 32 and the conductor 33 to the battery 25 to operate the motor 15 in the one or the other direction.

The regulator winding 17 is supplied with energy from three rectifier units 34, 35 and 36 each consisting of a pair of rectifier elements between which one conductor of a three-phase circuit is connected. The three conductors of the local circuit supplying the rectifier units are identified as 1', 2' and 3' to correspond, respectively, with the conductors 1, 2 and 3 of the power circuit to which they are connected through transformers 37 and 38. The three-phase voltage impressed on the local circuit conductors 1', 2' and 3' by the transformers 37 and 38, is a measure of the three-phase voltage of the power circuit and is represented in the vector diagram of Fig. 2 by the three solid vector lines 1—2, 2—3, and 3—1. The current in the three conductors 1, 2 and 3 is represented by the three vectors $I_1$, $I_2$, and $I_3$, respectively, at 100% P. F. load.

Two compensating device 42 and 43 are provided for the purpose of introducing voltage components into the local circuit such that the three-phase voltage impressed on the rectifiers 34, 35 and 36 for actuating the voltage responsive device 16 will correspond to the voltage of the power circuit 1, 2, 3 at some chosen point in the transmission line remote from the generator 4. The device 42 is a resistance drop compensator and the device 43 is a reactive drop compensator. The compensators 42 and 43 are provided with auto-transformer windings 44 and 45, respectively, that are connected in a circuit energized from the current transformer 46 that is associated with the phase conductor 3 of the power circuit. This circuit extends from one terminal of the transformer 46 through conductor 47 to the compensator terminal 48 through a variable tap connection 49 to a point on the winding 44, through a variable tap connection 52, compensator terminal 53, conductor 54, compensator terminal 55, variable tap connection 56 to a point on the winding 45, the variable tap connection 57, terminal 58, and conductor 59 to the other side of the current transformer 46. The variable connecting elements 49, 52, 56 and 57 are so adjusted as to impress desired voltages across the compensator windings 44 and 45.

Referring to the resistance compensator 42, a network including a reactor 62, a reactor 63, and a resistor 64 are connected in series circuit relation to each other across the terminals of the winding 44. A voltage $E_x$ that is in quadrature with the voltage impressed on the winding 44 is developed across the reactor 62 and is introduced through transformer 65 into the circuit through conductor 1', the output circuit from the transformer 65 being connected to the local circuit conductor 1' through terminals $X_1$ and $Y_1$. This vector is shown in the diagram of Fig. 2 as in phase with the phase voltage vector 1—2 which is in quadrature with the current vector $I_3$, representing the current in conductor 3 of the main power circuit. The voltage $E_{xr}$ is developed across the reactor 63 that is in quadrature with the voltage impressed across the winding 44 and is introduced through the transformer 66 into the circuit through conductor 3'. A voltage $E_{Rr}$ is developed across the resistor 64 that is in phase with the voltage impressed across the winding 44 and this voltage component is introduced into the circuit of conductor 3' through the transformer 67. The output windings of the transformers 66 and 67 are connected in series with the circuit conductor 3' between the compensator terminals $X_2$ and $Y_2$. The resultant voltage $E_{ZR}$ is in phase with the voltage vector 3—2, as shown in Fig. 2. The three voltage vectors $E_{xr}$, $E_{Rr}$ and $E_{ZR}$ are shown at the lower right hand corner in Fig. 2 and are effective to introduce a countervoltage to shorten the main vector 2—3 to the same extent as the voltage $E_x$ shortens the main vector 1—2. Thus if the points $X_1$ and $Y_2$ on the vector diagram of Fig. 2 are connected, a balanced three-phase voltage results, this voltage being a three-phase voltage compensated for ohmic line drop only.

Referring to the reactive drop compensator 43, a network comprising a reactor 71, a resistor 72 and a resistor 73 is connected in series circuit relation across the terminals of the winding 45. The reactor 71 develops a voltage component $E_{xx}$ that is 90° out of phase with the current vector $I_3$. The resistor 72 develops a voltage $E_{Rx}$ that is in phase with the current vector $I_3$. These two voltages combine to produce the resultant voltage $E_{zx}$ that is introduced through the transformer 74 between the compensator terminals $X_3$, $Y_3$ into the conductor 3'. This vector is at right angles to the phase voltage vector 2—3 as shown in Fig. 2. A voltage $E_R$ that is in phase with the vector $I_3$, is developed across the resistor 73 and impressed through the transformer 75 across the compensator terminals $X_4$, $Y_4$ and introduced into the circuit of conductor 3'. This vector, as shown in Fig. 2, is added vectorially to the vector $E_x$ at right angles thereto. The resultant triangle of voltage vectors shown in dotted lines in Fig. 2 connecting points 2, $Y_3$, $Y_4$ is the voltage vector compensated for both resistance drop and reactance drops in the circuit that is applied to the regulator voltage responsive element through the rectifying elements 34, 35 and 36. The several parts of the circuit across which voltage components are developed, are connected so that the voltage vectors add or subtract in the manner shown in Fig. 2.

It will be apparent from the above description of apparatus and circuits that a voltage has been developed from a single phase current which can be added to, or subtracted from, the three-phase voltage of the local circuit 1', 2' and 3' through which the voltage responsive device 16 is energized from the main power circuit 1, 2 and 3 to produce a balanced compensated three-phase voltage.

Many modifications of the circuit and apparatus illustrated and described within the spirit of my invention will occur to those skilled in the art, and I do not wish to be limited otherwise than by the scope of the appended claims.

I claim as my invention:

1. In combination, a three-phase electric power circuit, a device responsive to a three-phase voltage, a three-phase local circuit for supplying voltage to said device that is a measure of the voltage of the power circuit, means for compensating the voltage applied to said voltage responsive device for the voltage drop in said power circuit comprising a winding to which a voltage is applied that is a measure of the current in one power circuit phase conductor, a network connected to said winding for developing voltage components having predetermined phase relationships to two phase voltages, said network including reactor and resistor elements connected in series across said winding, and means for introducing voltage components developed across these elements into two circuit conductors of the three phase local circuit.

2. In combination, a three-phase electric power circuit, a device responsive to a three-phase voltage, a three-phase local circuit for supplying voltage to said device that is a measure of the voltage of the power circuit, means for compensating the voltage applied to said voltage responsive device for the voltage drop in said power circuit comprising a winding to which a voltage is applied that is a measure of the current in one power circuit phase conductor, a network connected to said winding for developing voltage components having predetermined phase relationships to two phase voltages, said network including reactor and resistor elements connected in series across said winding, and means for introducing voltage components developed across these elements into two circuit conductors of the three phase local circuit that are in phase with the ohmic drop in the respective phases of the power circuit.

3. In combination, a three-phase electric power circuit, a device responsive to a three-phase voltage, a three-phase local circuit for supplying voltage to said device that is a measure of the voltage of the power circuit, means for compensating the voltage applied to said voltage responsive device for the voltage drop in said power circuit comprising a winding to which a voltage is applied that is a measure of the current in one power circuit phase conductor, a network connected to said winding for developing voltage components having predetermined phase relationships to two phase voltages, said network including reactor and resistor elements connected in series across said winding, and means for introducing voltage components developed across these elements into two circuit conductors of the three phase local circuit that are in phase with the reactive drop in the respective phases of the power circuit.

4. In combination, a three phase electric power circuit, a device responsive to a three-phase voltage, a three-phase local circuit for supplying voltage to said device that is a measure of the voltage of the power circuit, means for compensating the voltage applied to said voltage responsive device for the voltage drop in said power circuit comprising two compensating devices each having a winding to which a voltage is applied that is a measure of the current in one power circuit phase conductor, a network connected to each of said windings for developing voltage components having predetermined phase relationships to the three phase voltages of the power circuit, said network including reactor elements and resistor elements connected in series across the winding, and means for introducing voltage components developed across these elements into two circuit conductors of the three phase local circuit to compensate for ohmic voltage drop and reactive voltage drop in the power circuit.

5. In combination, a three phase electric power circuit, a device responsive to a three-phase voltage, a three-phase local circuit for supplying voltage to said device that is a measure of the voltage of the power circuit, means for compensating the voltage applied to said voltage responsive device for the voltage drop in said power circuit comprising two compensating devices each having a winding to which a voltage is applied that is a measure of the current in one power circuit phase conductor, a network connected to each of said windings for developing voltage components having predetermined phase relationships to the three phase voltages of the power circuit, one of said networks including a plurality of reactor elements and a resistor element for developing voltage components that are in phase with the ohmic drop in two phases of the power circuit, and means for introducing said components into two circuit conductors of the local circuit, one of said networks including a plurality of resistor elements and a reactor element for developing voltage components that are in phase with the reactive drop in two phases of the power circuit, and means for introducing said components into two circuit conductors of the local circuit to produce a balanced three phase compensated voltage.

6. In combination, a three-phase electric power circuit, a device responsive to a three-phase voltage, a three-phase local circuit for supplying voltage to said device that is a measure of the voltage of the power circuit, means for compensating the voltage applied to said voltage responsive device for the voltage drop in said power circuit comprising two compensating devices each having a winding to which a voltage is applied that is a measure of the current in one power circuit phase conductor, a network connected to each of said windings for developing voltage components having predetermined phase relationships to the three phase voltages of the power circuit, one of said networks including a plurality of resistor elements and a reactor element for developing voltage components that are in phase with the reactive drop in two phases of the power circuit, and means for introducing said components into two circuit conductors of the local circuit to produce a balanced three-phase compensated voltage.

7. In combination, a three-phase electric power circuit, a device responsive to a three-phase voltage, a three-phase local circuit for supplying voltage to said device that is a measure of the voltage of the power circuit, means for compensating the voltage applied to said voltage responsive device for the voltage drop in said power circuit comprising two compensating devices each having a winding to which a voltage is applied that is a measure of the current in one power circuit phase conductor, a network connected to each of said windings for developing voltage components having predetermined phase relationships to the three phase voltages of the power circuit, one of said networks including a plurality of reactor elements and a resistor element for developing voltage components that are in phase with the ohmic drop in two phases of the power circuit, and means for introducing said components into two circuit conductors of the local circuit to produce a balanced three-phase compensated voltage.

LAWRENCE L. FOUNTAIN.